(12) United States Patent
Kawamura et al.

(10) Patent No.: US 6,312,164 B1
(45) Date of Patent: Nov. 6, 2001

(54) OPTICAL CONNECTOR AND METHOD OF AND FIXTURE FOR SETTING PROJECTION LENGTH OF OPTICAL FIBER

(75) Inventors: Yasumoto Kawamura, Tokyo; Takehiro Hayashi, Kawasaki; Ken Kanai, Ichihara; Kazuo Hogari, Tokyo; Shinichi Furukawa; Shinji Nagasawa, both of Mito, all of (JP)

(73) Assignees: The Furukawa Electric Co., Ltd.; Nippon Telegraph and Telephone Company, both of Tokyo (JP)

( * ) Notice: Subject to any disclaimer, the term of this patent is extended or adjusted under 35 U.S.C. 154(b) by 0 days.

(21) Appl. No.: 09/553,340

(22) Filed: Apr. 21, 2000

Related U.S. Application Data

(62) Division of application No. 09/097,046, filed on Jun. 12, 1998, now Pat. No. 6,089,759, which is a continuation of application No. PCT/JP97/03689, filed on Oct. 14, 1997.

(30) Foreign Application Priority Data

Oct. 16, 1996 (JP) .................................... 8-294594

(51) Int. Cl.[7] ...................................... G02B 6/32
(52) U.S. Cl. ................. 385/78; 385/79; 385/80; 385/81
(58) Field of Search .................... 385/78, 79, 80, 385/81–88, 64–66

(56) References Cited

U.S. PATENT DOCUMENTS

| 4,729,624 | * | 3/1988 | Kakii et al. ......................... 359/351 |
| 4,994,134 | * | 2/1991 | Knecht et al. ....................... 156/294 |
| 5,131,063 | * | 7/1992 | Monroe et al. ........................ 385/78 |
| 5,390,270 | * | 2/1995 | Hanazawa et al. ..................... 385/81 |

FOREIGN PATENT DOCUMENTS 0 742 456 A1   11/1996   (EP) ................................ G02B/6/38

* cited by examiner

*Primary Examiner*—Mohammad Y. Sikder
(74) *Attorney, Agent, or Firm*—Lacasse & Associates; Randy W. Lacasse; Kevin E. Greene

(57) ABSTRACT

The invention is directed to an optical connector in which a length of an optical fiber 5 projects from a connection end surface (16) of a ferrule (1) is accurately set, a method of and a fixture for setting the projection length of the optical fiber. A recess surface (33) is formed in a ferrule receiving surface (32). A depth of the recess surface (33) is equal to a length an optical fiber (5) projects from the connection end surface (16) of the ferrule (1). The ferrule (1) is held by ferrule holding members (35*a*) and (35*b*), so that the ferrule (1) is abutted against the ferrule receiving surface (32) by the urging force of compression springs (36). Through the ferrule (1), an optical fiber cored line (3) is projected from the connection end surface (16) of the ferrule (1) and abutted against the recess surface (33). The optical fiber cored line (3) is held by a cored line holding member (41), the cored line holding member (41) is urged toward the ferrule receiving surface (32) by the urging force of compression springs (42), and a tip of the optical fiber (5) is brought into a pressure contact with the recess surface (33).

1 Claim, 4 Drawing Sheets

OPTICAL CONNECTOR AND METHOD OF AND FIXTURE FOR SETTING PROJECTION LENGTH OF OPTICAL FIBER

This application is a Division of application Ser. No. 09/097,046, filed on Jun. 12, 1998 now U.S. Pat. No. 6,089,759, which is a continuation of PCT/JP97/03689 filed Oct. 14, 1997.

TECHNICAL FIELD

The present invention is related to an optical connector in which an optical fiber projects from a connection end surface of a ferrule, a method of setting a projection length of the optical fiber of the optical connector, and a fixture for setting the projection length of the optical fiber.

BACKGROUND ART

An optical connector is in use in which an optical fiber projects a little longer from a connection end surface of an optical connector. In this type of optical connector, it is necessary to set a projection length the optical fiber projects from the connection end surface to a constant length. A fixture for and a method of assembling such an optical connector are proposed in Japanese Laid-Open Patent Publication No. Sho-64-77003.

However, what is proposed in the publication requires that a support seat which has a complex structure is used for a ferrule, an optical fiber cored line, etc., and that a projection length of an optical fiber from an end surface of the ferrule is set using a microscope. Hence, a structure of a required apparatus is complicated, a manner in which the apparatus is to be handled is complex, and it is not possible to efficiently assemble an optical connector in the field where optical connectors are connected to each other.

Further, with respect to a conventional optical connector, a sufficient study has not been yet given to a relationship between a projection length of an optical fiber and a connection characteristic of connection of optical fibers through connectors. While the technique described in the publication above discloses to set a projection length of an optical fiber to 50 $\mu$m as a guideline, there is a doubt if the disclosed projection length is appropriate.

The present invention has been made to solve such a theme. Accordingly, an object of the present invention is to obtain an optical connector in which a projection length an optical fiber projects from a tip (i.e., connection end surface) of a ferrule is set to an optimal value, and a method of and a fixture for easily setting the projection length of the optical fiber of the optical connector in the field where optical connectors are connected to each other.

DISCLOSURE OF THE INVENTION

The present invention uses the following means to achieve the object above. That is, in the invention directed to an optical connector in which a ferrule includes an optical fiber insertion hole which opens in a connection end surface of the ferrule and an optical fiber which is inserted through the optical fiber insertion hole is fixedly held by the ferrule, means for solving the problem is a structure in which the optical fiber which is inserted through the optical fiber insertion hole projects 10 to 30 $\mu$m from the connection end surface of the ferrule.

Meanwhile, in the invention directed to a method of setting a projection length of an optical fiber of an optical connector, means for solving the problem is a structure in which a recess surface is formed locally in a ferrule receiving surface, against which a connection end surface of a ferrule of the optical connector is pressed, to a depth which is equal to a projection length the optical fiber is to project from the connection end surface of the ferrule, with the connection end surface of the ferrule pressed against the ferrule receiving surface across the recess surface, the optical fiber which is inserted through an optical fiber insertion hole is then projected from the connection end surface of the ferrule while pressed against the recess surface, and with the optical fiber pressed against the recess surface, the optical fiber is fixed to the ferrule.

In the invention directed to a fixture for setting a projection length of an optical fiber of an optical connector, means for solving the problem is a structure which comprises: a ferrule receiving surface whose local portion includes a recess surface which is formed to a depth which is equal to a projection length the optical fiber is to project from a connection end surface of a ferrule of the optical connector; ferrule holding means for holding the ferrule for free movement against the ferrule receiving surface in such a manner that an opening formation region for an optical fiber insertion hole which is opened in the connection end surface of the ferrule is opposed against the recess surface of the ferrule receiving surface; ferrule pressing means for pressing the ferrule which is held by the ferrule holding means against the ferrule receiving surface; cored line holding part for holding an optical fiber cored line with a tip of the optical fiber inserted into the optical fiber insertion hole of the ferrule, said cored line holding part being free movable in a direction of the ferrule receiving surface; and cored line pressing means for pressing said cored line holding part toward the ferrule receiving surface so that the tip of the optical fiber which projects from the optical fiber insertion hole is pressed against the recess surface of the ferrule receiving surface.

According to the present invention, the connection end surface of the ferrule is pressed against and across the recess surface which is formed in the ferrule receiving surface, the optical fiber which is inserted through the optical fiber insertion hole of the ferrule is pressed against the recess surface of the ferrule receiving surface, and in this condition, the optical fiber is fixedly held by the ferrule so that the optical fiber projects an optimal length which is the same as the depth of the recess surface from the connection end surface, whereby a desired optical connector is easily assembled.

Since the optical connector according to the present invention requires that the optical fiber projects a projection length of 10 to 30 $\mu$m from the connection end surface of the ferrule, a desirable connection characteristic is obtained which satisfies both a connection loss and a reflection attenuation due to connection of optical connectors. Hence, it is possible to obtain an optical connector which exhibits an excellent connection characteristic of connection using connectors and which is highly reliable.

Further, with respect to setting of the projection length the optical fiber projects from the connection end surface of the ferrule, it is possible to accurately set the projection length of the optical fiber which is equal to the depth of the recess surface in an extremely easy manner, only by pressing the tip of the optical fiber which penetrates the ferrule against the recess surface while pressing the ferrule against the ferrule receiving surface. It is therefore possible to easily set the projection length of the optical fiber in the field where optical connectors are connected to each other, without requiring skill of an operator. Thus, the present invention is remarkably valuable.

In addition, the fixture for setting a projection length of an optical fiber of an optical connector according to the present invention is extremely easy to handle, since the fixture has a simple structure which comprises the ferrule receiving surface which includes the recess surface whose depth is equal to a projection length the optical fiber is to project, means for holding the ferrule and abutting the connection end surface of the ferrule against the ferrule receiving surface, and means for pressing the tip of the optical fiber which penetrates the ferrule against the recess surface of the ferrule receiving surface. Moreover, it is possible to accurately set the projection length of the optical fiber, and therefore, it is possible to provide such a fixture for setting a projection length of an optical fiber according to the present invention which has such an excellent capability at an inexpensive price.

BEST MODE FOR CARRYING OUT THE INVENTION

Figure 1:
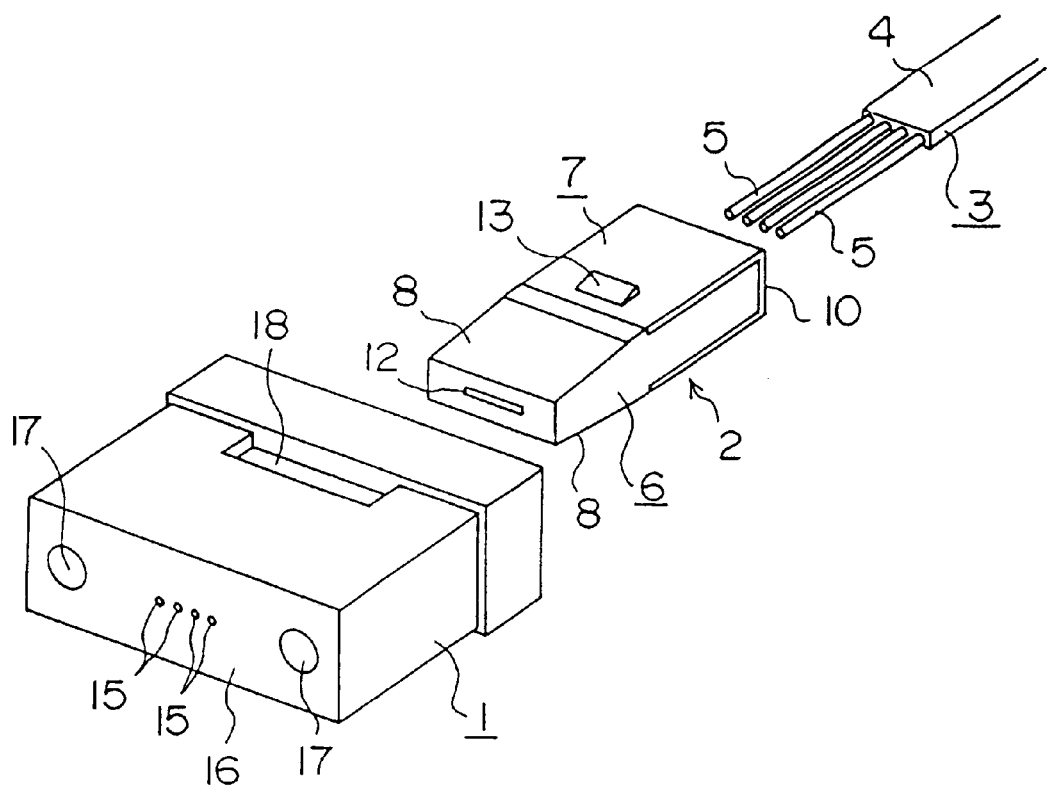
FIG. 1 is an explanatory structure diagram showing an optical connector according to a first preferred embodiment of the present invention as it is exploded.
Figure 2:
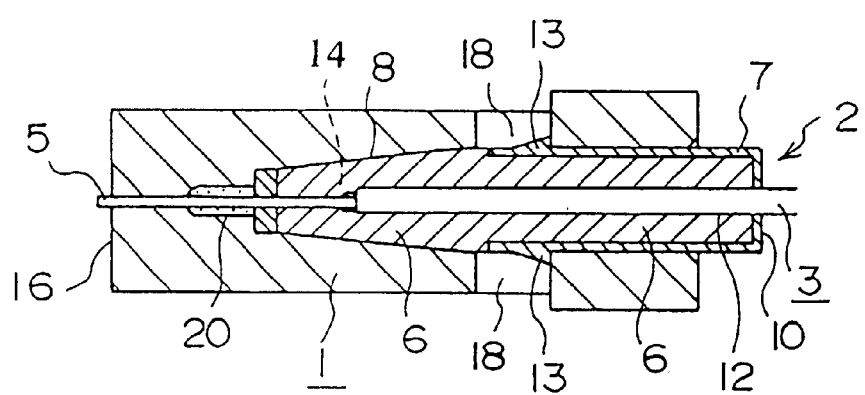
FIG. 2 is a cross sectional structure diagram showing the optical connector according to the first preferred embodiment as it is assembled.

To describe the present invention in detail, the present invention will be described with reference to the associated drawings. FIGS. 1 and 2 show an optical connector according to a first preferred embodiment of the present invention. FIG. 1 shows the optical connector as it is exploded, while FIG. 2 shows the optical connector as it is assembled.

The optical connector according to the preferred embodiment comprises a ferrule 1, and fiber holding means 2 which is inserted through and mounted to the ferrule 1. An optical fiber cored line 3 is formed by a multi-cored line such as an optical fiber ribbon. A sheath 4 is removed at a tip portion of the optical fiber cored line 3, whereby an optical fiber (bare optical fiber) 5 is exposed.

The fiber holding means 2 comprises an elastic holding member 6 of an elastic material such as a rubber, and a presser frame member 7 which is channel-shaped and which holds the elastic holding member 6 at a rear end and on a top and a bottom surfaces of the elastic holding member 6. The elastic holding member 6 is shaped like a flattened rectangle box. At a front end side, the top and the bottom surfaces of the elastic holding member 6 form a tapering surface 8 whose thickness is thinner toward the front end.

A cored line insertion hole 12 which the optical fiber cored line 3 is inserted into is formed in a rear end surface 10 of the presser frame member 7 and inside the elastic holding member 6. The cored line insertion hole 12 inside the elastic holding member 6 is fine and narrow toward a front end of the hole to define a fine hole through which an optical fiber 5 is passed, but is rather large in opening width in a vertical direction toward a rear end of the hole to define a large hole through which the sheath 4 of the optical fiber cored line 3 is passed. The presser frame member 7 is formed by a metal plate or a plastic plate whose hardness is larger than that of the elastic holding member 6. Claws 13 are formed to a top and a bottom surfaces of the presser frame member 7 to project from the top and the bottom surfaces of the presser frame member 7.

Within the ferrule 1, a tapering hole 14 is formed whose tip receives the optical fiber holding means 2. In front of and in distance from the tapering hole 14, as many optical fiber insertion holes 15 as cored lines of the optical fiber cored line 3 are formed in an arrangement which extends horizontally from the left-hand side to the right-hand side. A tip of each optical fiber insertion hole 15 is open in a connection end surface 16 of the ferrule 1. Engagement holes 17 are formed to the left-hand side and the right-hand side of the group of the arranged optical fiber insertion holes 15, to receive guide pins which are used for connecting an optical connector.

A top and a bottom angles of the tapering hole 14 match with tapering angles of the tapering surface 8 of the elastic holding member 6. Further, behind the ferrule 1, a claw engagement hole 18 is formed which penetrates in the vertical direction.

In the disassembled condition as that shown in FIG. 1, the optical fiber cored line 3 is inserted through the fiber holding means 2. With the tips of the optical fibers 5 projecting from a front end surface of the elastic holding member 6, the fiber holding means 2 is inserted through the tapering hole 14 of the ferrule 1. Although this stops the insertion of the elastic holding member 6 at a position at which the tapering surface 8 of the elastic holding member 6 abuts the tapering surface of the tapering hole 14, as the fiber holding means 2 is further inserted, the elastic holding member 6, subjected to the pressure from the slanted surfaces of the tapering hole 14 of the ferrule 1, elastically deforms. As the insertion further progresses and the claws 13 fit into the claw engagement hole 18, the claws 13 and the claw engagement hole 18 engage with each other, so that the fiber holding means 2 is in a release-proof state which prevents releasing from the ferrule 1. At this stage, the elastic holding member 6 holds the optical fibers 5 from above and below due to the force of the elastic deformation, and therefore, the optical fibers 5 are fixedly held within the ferrule 1 because of the elastic force of the elastic holding member 6, which completes assembly of the optical connector. With the assembly completed, the optical fibers 5 project a predetermined length (15 $\mu$m in this preferred embodiment) from the connection end surface 16 of the ferrule 1. In FIG. 2, denoted at 20 is an adhesive agent which may be omitted.

Figure 3A:
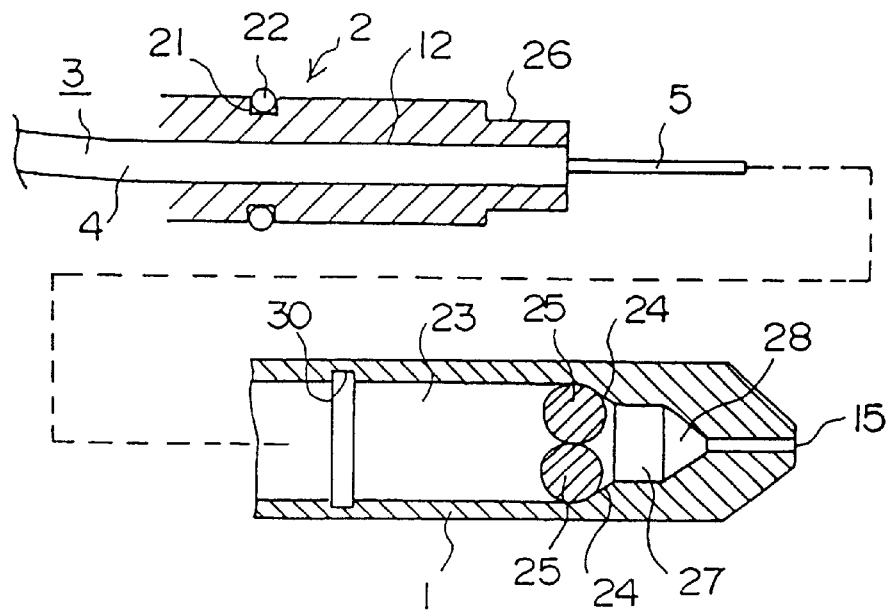
FIGS. 3(a) to 3(c) are explanatory structure diagrams showing an optical connector according to a second preferred embodiment of the present invention as it is assembled in order.
Figure 3B:
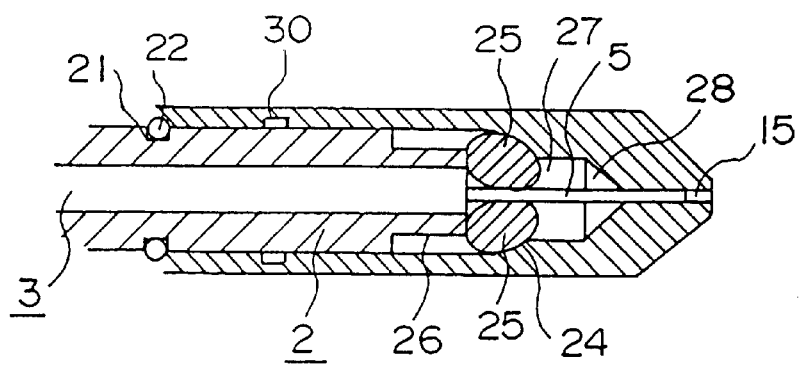

FIGS. 3(a) to 3(b) show an optical connector according to a second preferred embodiment of the present invention. In the second preferred embodiment, the fiber holding means 2 is formed by a synthetic resin or the like into a shape like a flattened rectangle box, the cored line insertion hole 12 is formed in a central axis line portion so that the optical fiber cored line 3 is inserted through the cored line insertion hole 12, a ring containing groove 21 is formed in an outer peripheral surface of the fiber holding means 2, and a clamping ring 22 is fit in the ring containing groove 21.

In the ferrule 1, an insertion hole 23 is formed through which the fiber holding means 2 is inserted, and elastic balls 25 of a rubber or the like are arranged one top the other on a tapering surface 24 on a front end side of the insertion hole 23. At a tip end of the tapering surface 24, a stepped engagement chamber 27 is formed which fits with a stepped surface 26 which is formed toward a tip end of the fiber holding means 2. Beyond the stepped engagement chamber 27, a pressure contact driving chamber 28 is formed which has a top and a bottom tapering surfaces whose opening widths are smaller toward a tip end of the pressure contact driving chamber 28. Beyond the pressure contact driving chamber 28, the optical fiber insertion holes 15 are formed as they are connected to each other through which the optical fibers 5 of the optical fiber cored line 3 are inserted. In addition, behind the insertion hole 23, a ring locking groove 30 is formed in a circumferential shape.

In the second preferred embodiment, the optical fiber cored line 3 with the sheath 4 removed at the tip portion is inserted into the cored line insertion hole 12 of the fiber holding means 2 as shown in FIG. 3(a), and in this condition, the fiber holding means 2 is inserted into the insertion hole 23 of the ferrule 1.

Figure 3C:
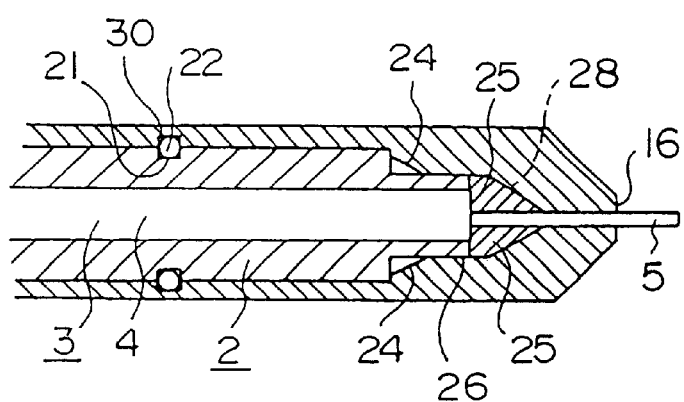

As the fiber holding means 2 is further inserted from a position at which the tip portion of the fiber holding means 2 engages with the elastic balls 25 as shown in FIG. 3(b), the elastic balls 25 are pushed out forward while compressed under pressure and pressed into the pressure contact driving chamber 28 as shown in FIG. 3(c). Due to the pressure force from wall surfaces of the pressure contact driving chamber 28, the optical fibers 5, subjected to the elastic force of the elastic deformation of the elastic balls 25 from above and below, are fixedly held. At this stage, the clamping ring 22 proceeds to the position of the ring locking groove 30 and further intrudes into the ring locking groove 30, so that the fiber holding means 2 enters a release-proof state which prevents releasing from the ferrule 1, which completes assembly of the optical connector. The optical fibers 5 penetrate the optical fiber insertion holes 15 of the ferrule 1 and project outside a predetermined length (15 μm in this preferred embodiment) from the connection end surface 16 of the ferrule 1.

Figure 4:
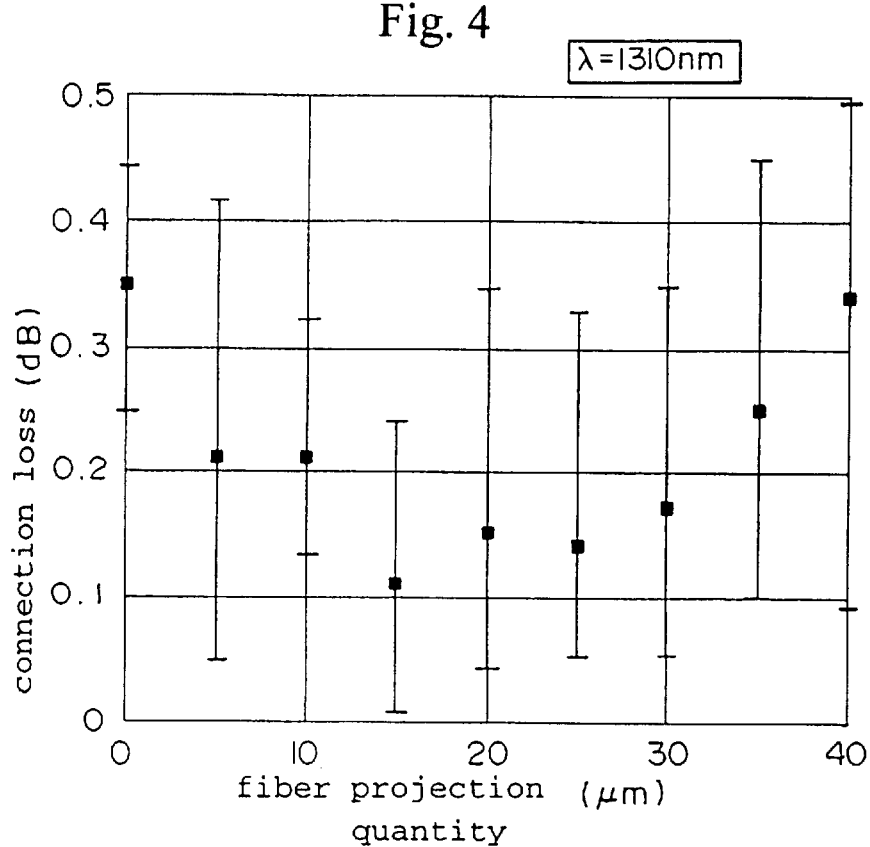
FIG. 4 is a graph of measured data showing a relationship between a connection loss and a projection quantity of an optical fiber of the optical connector according to the preferred embodiment.
Figure 5:
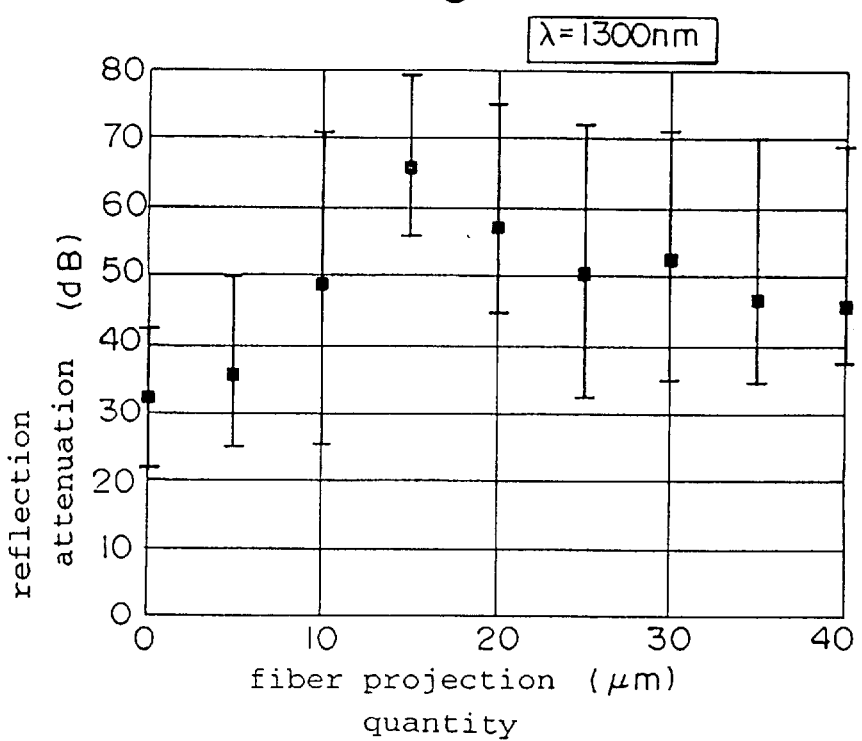
FIG. 5 is a graph of measured data showing a characteristic of a reflection attenuation with respect to a projection quantity of the optical fiber of the optical connector according to the preferred embodiment.

FIGS. 4 and 5 show measured results of a connection characteristic of connection which were obtained using the optical connectors according to the first and the second preferred embodiments described above while changing a quantity the optical fibers 5 project from the connection end surface 16. FIG. 4 shows measured results of connection losses of the optical connectors against quantities of the projection of the optical fibers 5, while FIG. 5 shows measured results of reflection attenuation of the optical connectors against quantities of the projection of the optical fibers 5. A reflection attenuation is a quantity of attenuation which is caused by reflection of light which is created at abutting end surfaces of optical fibers which are abutted against each other when optical connectors are connected to each other. An influence of reflected light is smaller as a reflection attenuation is larger, which implies an improvement in a connection characteristic.

FIGS. 4 and 5 show measured results which were obtained by allowing light whose wavelength is λ=1,300 nm to impinge upon optical fibers of more than one samples of optical connectors. FIGS. 4 and 5 each show ranges of variations of measurements and measured average values (which are denoted as black circles) at the positions of projection quantities of the respective optical fibers. According to the measured results shown in FIG. 4, a connection loss is the smallest when a projection quantity of the optical fibers 5 is 15 μm. Meanwhile, according to the measured results shown in FIG. 5, a reflection attenuation is the largest when a projection quantity of the optical fibers 5 is 15 μm. Thus, it was proved that the connection characteristic is the most preferable both in terms of a connection loss and a reflection attenuation when a projection quantity of the optical fibers 5 is 15 μm. Further, considering both a connection loss and a reflection attenuation, an excellent and practical characteristic result was obtained when a projection quantity of the optical fibers 5 was in the range of 10 to 30 μm. From the measurement results, it was found that in the optical connectors according to the first and the second preferred embodiments described above, it is proper to set a quantity the optical fibers 5 project from the connection end surface 16 of the ferrule 1 to the range of 10 to 30 μm, and particularly preferably around 15 μm.

Figure 6:
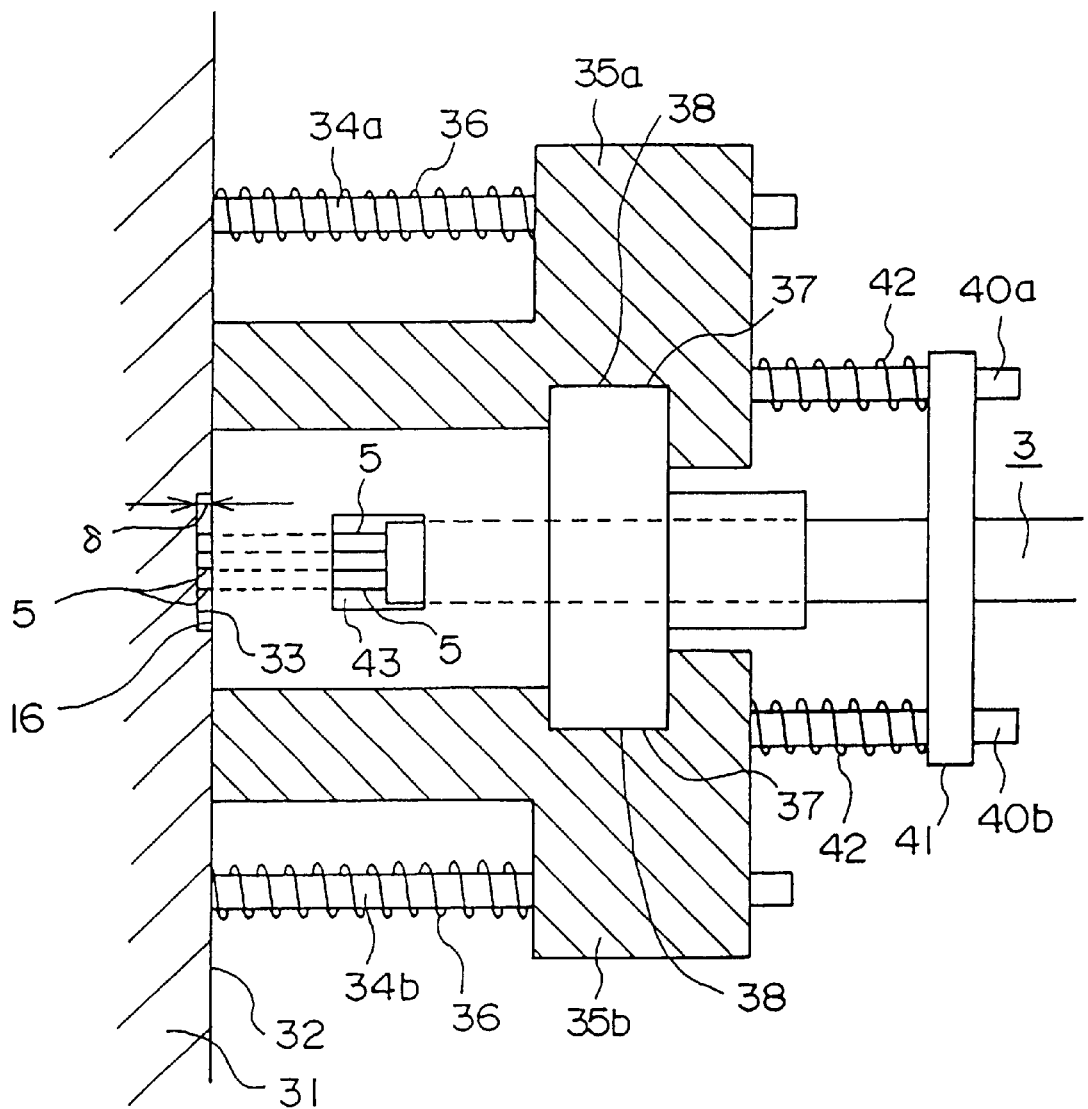
FIG. 6 is an explanatory structure diagram showing a fixture for setting a projection length of an optical fiber according to a preferred embodiment of the present invention.

FIG. 6 shows a fixture for setting a projection length of an optical fiber of an optical connector according to a preferred embodiment, with which a length the optical fibers 5 are to project from the connection end surface 16 of the ferrule 1 is set during assembly of the optical connector. In FIG. 6, a surface of a receive seat 31 which is formed by a block member or the like is a ferrule receiving surface 32, and a recess surface 33 is formed locally in the ferrule receiving surface 32. A depth δ of the recess surface 33 is set equal to the length the optical fibers 5 are to project from the connection end surface 16 of the ferrule 1. During assembly of the optical connectors according to the first and the second preferred embodiments described above, the depth of the recess surface 33 is set to 15 μm, for example. A width of the recess surface 33 is a width which contains the respective optical fibers 5 which project from the connection end surface 16 of the ferrule 1.

At positions on the both sides of the recess surface 33 in the ferrule receiving surface 32, fixing pins 34a and 34b are disposed perpendicular to the ferrule receiving surface 32. Ferrule holding members 35a and 35b which serve as ferrule holding means are fit for free movement to the fixing pins 34a and 34b, respectively. The respective ferrule holding members 35a and 35b are always urged toward the ferrule receiving surface 32 by compression springs 36 which are fit to the fixing pins 34a and 34b. One ends of the compression springs 36 are fixed to the ferrule receiving surface 32, while the other ends of the compression springs 36 are fixed to the corresponding ferrule holding members 35a and 35b.

Ferrule holding parts 37 are formed to face opposed surfaces of the ferrule holding members 35a and 35b. An extension formation part 38 of the ferrule which is to be assembled is inserted from a direction which is perpendicular to the plane of FIG. 6 and held between the ferrule holding parts 37.

Hinge pins 40a and 40b are disposed to tip end surfaces (which are right-most surfaces in FIG. 6) of the respective ferrule holding members 35a and 35b, so that the hinge pins 40a and 40b are perpendicular to the ferrule receiving surface 32. A cored line holding member 41 which functions as a cored line holding part is fit for free movement to the hinge pins 40a and 40b. Compression springs 42 are fit to the hinge pins 40a and 40b. One ends of the compression springs 42 are fixed to the corresponding ferrule holding members 35a and 35b, and the other ends of the compression springs 42 are fixed to the cored line holding member 41. As a result, the cored line holding member 41 is urged by the compression springs 42 toward the ferrule receiving surface 32. The compression springs 36 described above function as ferrule pressing means, and the compression springs 42 function as cored line pressing means. In addition, to the cored line holding member 41, a holding mechanism (not illustrated) is disposed which holds the optical fiber cored line 3 using a known pinching means.

Next, a description will be given on an operation using this fixture for setting a length an optical fiber is to project from the connection end surface 16 of the ferrule 1. First, with the optical fiber cored line 3 inserted through the ferrule 1, the ferrule 1 is held by the ferrule holding members 35a and 35b. When the ferrule 1 is held, with the ferrule holding members 35a and 35b lifted a small distance in the right-hand direction in FIG. 6 against the urging force of the compression springs 36, the extension formation part 38 of the ferrule 1 is inserted through the ferrule holding parts 37 of the ferrule holding members 35a and 35b to thereby hold the ferrule 1. Following this, the optical fiber cored line 3 which is inserted through the ferrule 1 is held using the cored line holding member 41.

By releasing the lifting force which lifts up the ferrule holding members 35a and 35b in this condition, the ferrule holding members 35a and 35b move toward the ferrule receiving surface 32 because of the urging force of the compression springs 36, and the connection end surface of the ferrule 1 abuts the ferrule receiving surface 32 and is pressed against the ferrule receiving surface 32 by the compression springs 36.

On the other hand, the optical fibers which project from the connection end surface 16 of the ferrule 1 abut the recess surface 33 under pressure because of the urging force of the compression springs 42 toward the ferrule receiving surface 32. As a result, the optical fibers 5 project the depth of the recess surface 33 from the connection end surface 16 of the ferrule 1, with the connection end surface 16 of the ferrule 1 abutting the ferrule receiving surface 32, whereby the projection length of the optical fibers 5 is accurately set. As an adhesive agent is injected into an adhesive injecting hole 43 which is formed in the ferrule 1 in this condition, the optical fibers 5 are fixedly bonded to the ferrule 1, thereby completing assembly of the optical connector. Thus, in the optical connector which is obtained, the optical fibers 5 project a desired length from the connection end surface 16 of the ferrule 1.

While the example which is shown in FIG. 6 requires to use an adhesive agent to fix the optical fibers 5 to the ferrule 1, the optical fibers 5 may be fixedly held within the ferrule 1 under elastic compression force as shown in FIGS. 1 and 3(a) to 3(c). In this case, for example, in FIG. 6, with the ferrule 1 abutted against the ferrule receiving surface 32 and the tips of the optical fibers 5 abutted against the recess surface 33, the fiber holding means 2 which is shown in FIGS. 1 and 3(a) to 3(c) is inserted through the ferrule 1, and the optical fibers 5 are fixedly held within the ferrule 1 under elastic compression force which is created as the ferrule 1 and the fiber holding means 2 are pressed against each other by engaging the claws 13 with the claw engagement hole 18 in the case of FIG. 1 and by engaging the clamping ring 22 with the ring locking groove 30 in the case of FIGS. 3(a) to 3(c). As a result, in a similar manner, as shown in FIG. 6, an optical connector is obtained in which the optical fibers project from the connection end surface 16 of the ferrule 1 by a projection length which is the same as the depth of the recess surface 33.

Hence, by appropriately setting the depth of the recess surface 33 of the ferrule receiving surface 32, it is possible to freely set a length of the optical fibers 5 to project from the ferrule 1. While a desirable connection characteristic is obtained without grinding the tip end surfaces of the optical fibers 5 which project from the ferrule 1, when the projected tip end surfaces of the optical fibers 5 are to be ground, the projection length of the optical fibers is set longer to make up a quantity which is to be ground.

INDUSTRIAL APPLICABILITY

As described above, the optical connector according to the present invention is appropriate for connecting an optical fiber of a one-cored or a multi-cored type with an excellent connection characteristic. Meanwhile, the method of and the fixture for setting a projection length of an optical fiber of an optical connector are appropriate for manufacturing the optical connector according to the present invention in which a tip of an optical fiber projects a predetermined length from a connection end surface of a ferrule.

What is claimed is:

1. A fixture for setting a projection length of an optical fiber of an optical connector, comprising: a ferrule receiving surface whose local portion includes a recess surface which is formed to a depth which is equal to a projection length the optical fiber is to project from a connection end surface of a ferrule of the optical connector; ferrule holding means for holding the ferrule for free movement against the ferrule receiving surface in such a manner that an opening formation region for an optical fiber insertion hole which is opened in the connection end surface of the ferrule is opposed against the recess surface of the ferrule receiving surface; ferrule pressing means for pressing the ferrule which is held by the ferrule holding means against the ferrule receiving surface; cored line holding part for holding an optical fiber cored line with a tip of the optical fiber inserted into the optical fiber insertion hole of the ferrule, said cored line holding part being free movable in a direction of the ferrule receiving surface; and cored line pressing means for pressing said cored line holding part toward the ferrule receiving surface so that the tip of the optical fiber which projects from the optical fiber insertion hole is pressed against the recess surface of the ferrule receiving surface.

* * * * *

UNITED STATES PATENT AND TRADEMARK OFFICE
CERTIFICATE OF CORRECTION

PATENT NO. : 6,312,164 B1
DATED : November 6, 2001
INVENTOR(S) : Kawamura et al.

It is certified that error appears in the above-identified patent and that said Letters Patent is hereby corrected as shown below:

<u>Title page,</u>
Item [73], Assignees should read -- The Furukawa Electric Co., Ltd.; Nippon Telegraph and Telephone Corporation, both of Tokyo (JP) --

Item [57], ABSTRACT, the last sentence of the abstract has been omitted. Please insert at the end of the abstract the following:

-- In this condition, an adhesive agent is injected into an adhesive injecting hole (43) of the ferrule (1) so that the optical fiber (5) is fixedly bonded to the ferrule (1), thereby obtaining an optical connector in which the optical fiber (5) projects a predetermined length from the connection end surface (16) of the ferrule (1). --

Signed and Sealed this

Twenty-third Day of July, 2002

*Attest:*

*Attesting Officer*

JAMES E. ROGAN
*Director of the United States Patent and Trademark Office*